STEERING DIAGRAM

INVENTORS
ANDRE J. MEYER
EMMET A. MOSSMAN

ATTORNEY

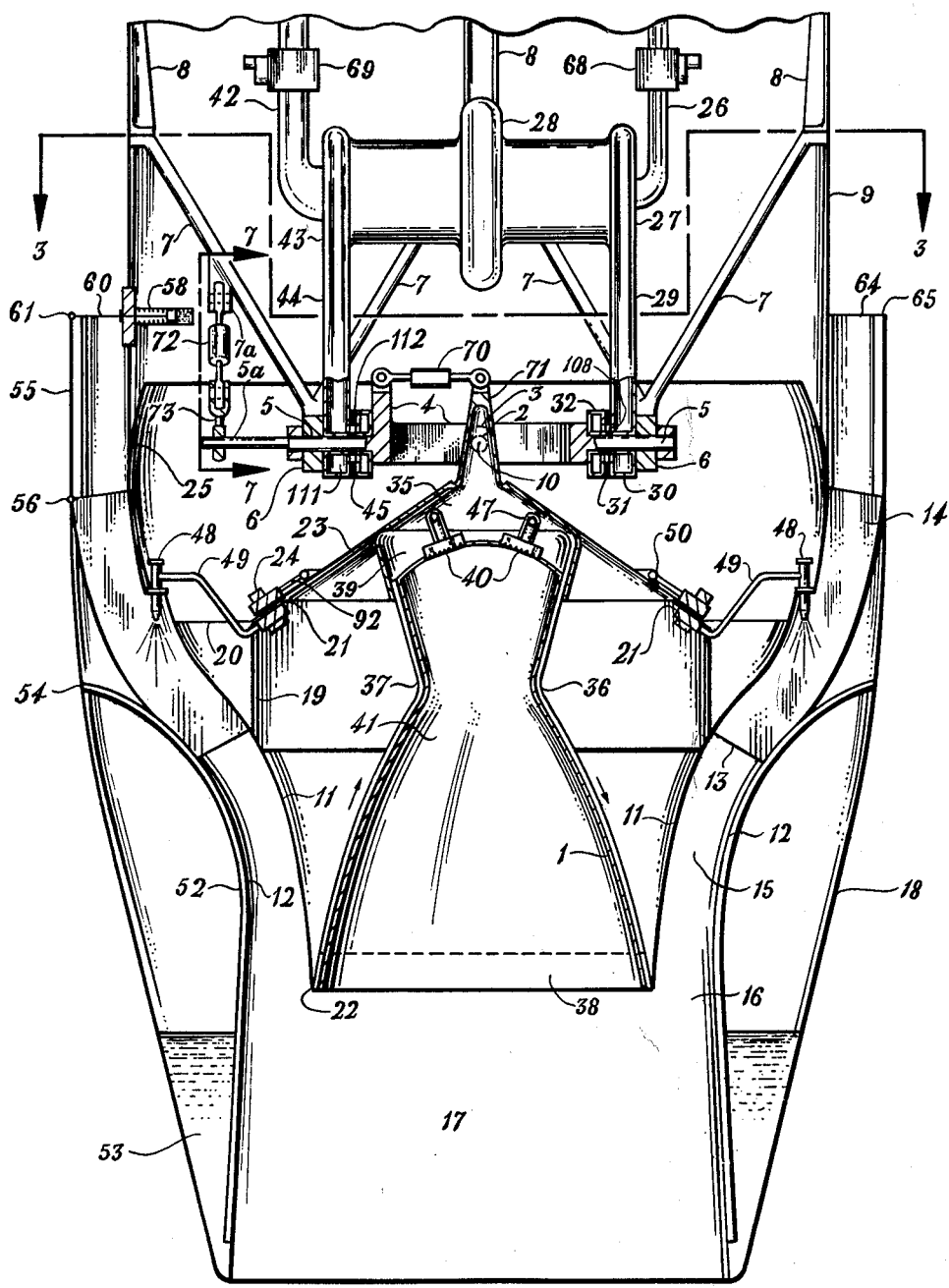
Fig_2_
INVENTORS
ANDRE J. MEYER
EMMET A. MOSSMAN
ATTORNEY

April 6, 1965  A. J. MEYER ETAL  3,176,464
DUCTED ROCKET ENGINE
Filed May 24, 1960  5 Sheets-Sheet 3
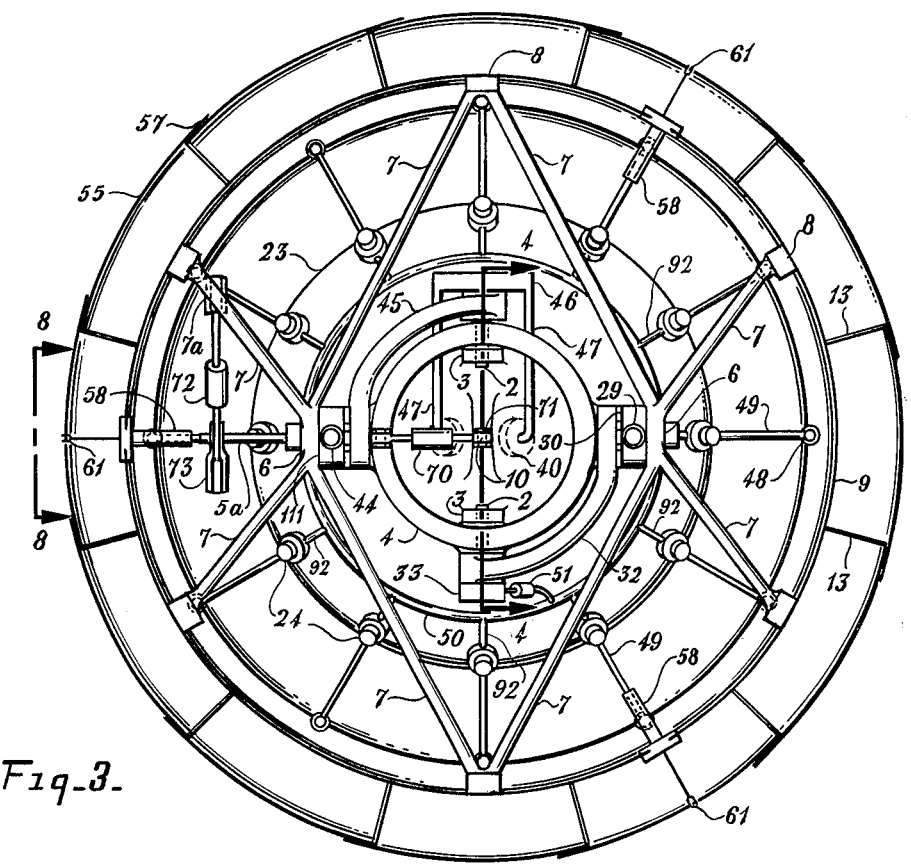
Fig-3-
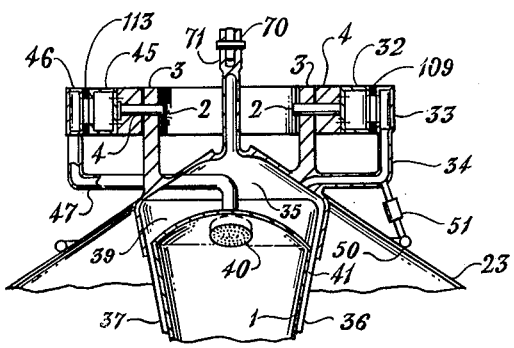
Fig-4-
INVENTORS
ANDRE J. MEYER
EMMET A. MOSSMAN
ATTORNEY

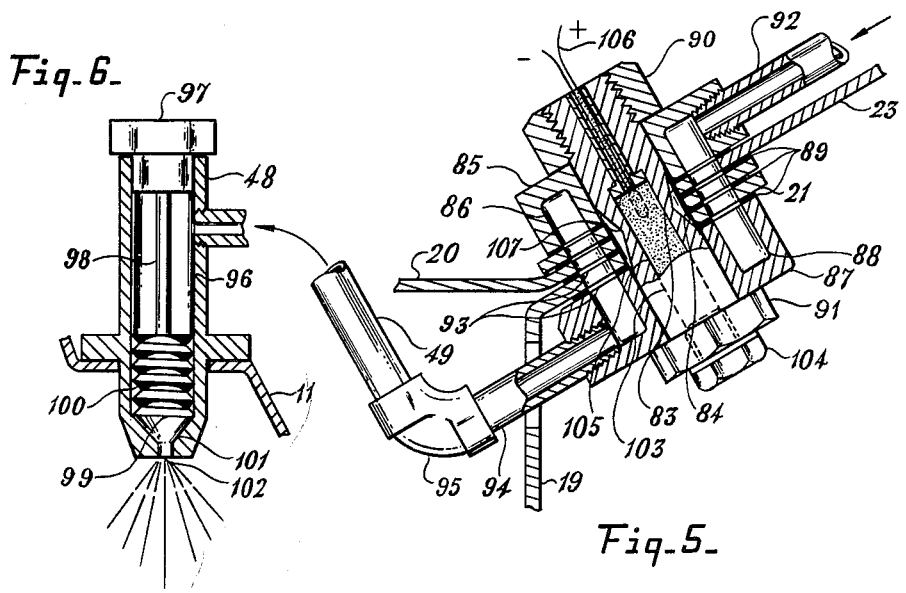
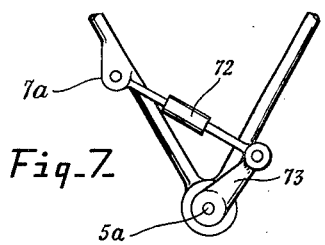
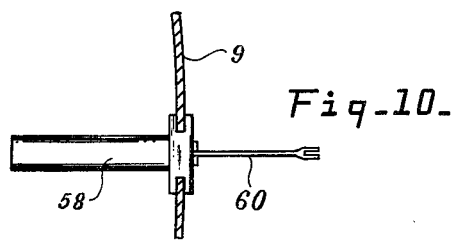
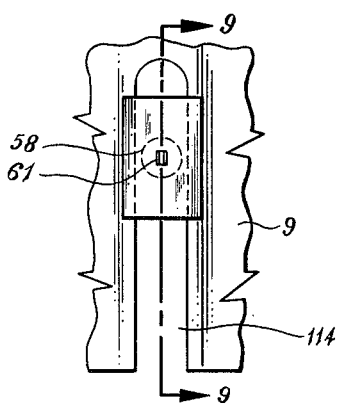
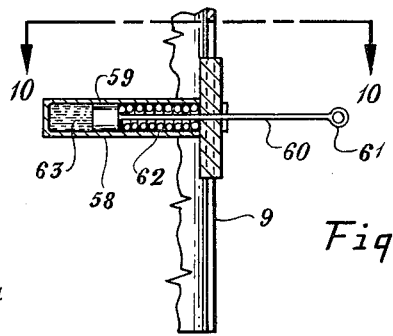

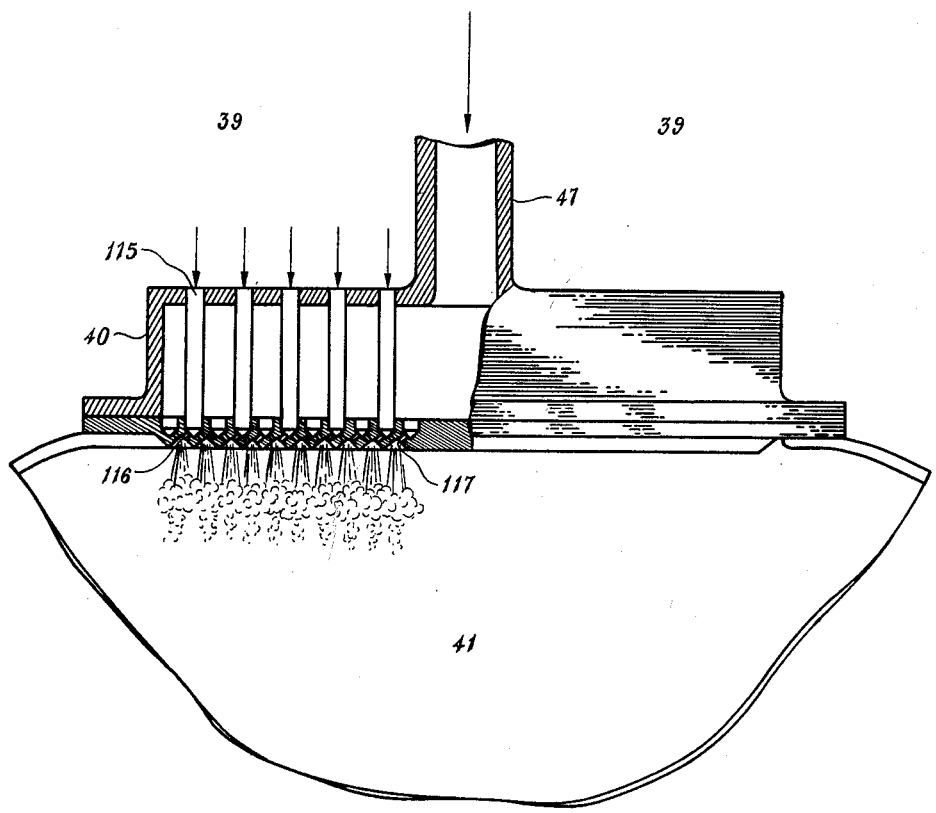
Fig_12_

United States Patent Office 3,176,464
Patented Apr. 6, 1965

3,176,464
DUCTED ROCKET ENGINE
Andre J. Meyer, Littleton, and Emmet A. Mossman,
Englewood, Colo., assignors to Martin-Marietta Corporation, a corporation of Maryland
Filed May 24, 1960, Ser. No. 31,454
14 Claims. (Cl. 60—35.55)

This invention relates to a thrust augmentation arrangement for a missile or the like, and more particularly to an arrangement for inducing a flow of secondary air around and into the exhaust gases emanating from the engine of the missile for the purpose of providing superior combustion characteristics, for providing much greater efficiency at lower altitude, and in general, augmenting the thrust of the missile engine.

During the first hundred seconds of flight of one large rocket missile, an amount of propellant is used which corresponds to about 55% of the gross weight of the missile, with the altitude reached in this interval being approximately 100,000 feet. Unfortunately, only approximately 1% of the energy expended was effectively utilized, and appeared as useful energy in the payload. About 10% of this energy was used to overcome air resistance, and nearly all the rest went into heat and kinetic energy of the exhaust gas, yet the thermal efficiency of the engine during the flight was never below 42%.

After this extremely wasteful period, conditions rapidly improve and in fact 32% of the energy available in the propellants remaining after these first hundred seconds of flight will be converted into kinetic energy of the payload. Therefore, had it been possible to employ an augmentation arrangement that utilizes atmospheric oxygen for additional combustion during the earlier phase of flight, the $I_{sp}$ (specific impulse) of the rocket could have been sufficiently increased to have extended the range of the missile almost 1,000 miles.

The above-mentioned losses are evidently the result of the very poor propulsive efficiency obtained at low flight speeds. Propulsive efficiency may be expressed as:

$$\eta_p = \frac{Fv}{Fv + \frac{1}{2}\dot{m}(c-v)^2} = \frac{2v/c}{1+(v/c)^2}$$

Where
$F$=thrust=$\dot{m}c$
$\dot{m}$=propellant mass flow/sec.
$v$=missile velocity
$c$=exhaust velocity
$Fv$=useful work/sec.
$\frac{1}{2}\dot{m}(c-v)^2$=kinetic energy of exhaust gas Since the missile must start from $v=0$, the propulsive efficiency will always be zero at take off, but after the vehicle has acquired some velocity, there are two means of improving the propulsive efficiency:

(1) Increase the thrust and hence the acceleration without increasing the exhaust velocity. This would make $v/c$ larger and $(c-v)$ smaller at all times, except at the time zero.

(2) Decrease the exhaust velocity maintaining the thrust. This would also make $v/c$ larger and $(c-v)$ smaller at all times, except at the time zero. However, with the same thrust, no improvement in performance can result. The improvement of $\eta_p$ is only the result of the reduction of kinetic energy in the exhaust and is therefore of academic rather than practical value.

Both of these means can be accomplished by increasing the mass flow by the injection of gas into the exhaust stream, provided this gas is not carried by the missile. Obviously this can only be done while the rocket is in the atmosphere. The path through the atmosphere may be lengthened by planning the trajectory so that it starts making a small angle with the horizontal plane at the launching site, but eventually the missile will reach an altitude and velocity where the air addition to the jet is no longer advantageous.

The first mentioned means will increase the starting acceleration which, however, may diminish continually as the missile rises, until it equals the conventional acceleration at which point the mixing device must be dropped. Since in ordinary operation the final first stage acceleration equals 4.5 times the initial one, the starting thrust of the air breathing rocket could be raised to 4.5 times the normal thrust without exceeding the operating stresses for which the missile is designed.

It is therefore to be seen that the relatively inefficient regime in the early flight phase is a region in which improvements might be made. One particular means according to this invention for increasing the specific impulse of the first stage rocket motor is to use a nozzle with an increased ratio of the exit area to the throat area in conjunction with an annular ejector. The ejector induces air flow from the free stream, ducts it around the nozzle and reduces the pressure at the nozzle exit, where the induced air begins to mix with the rocket exhaust. Research on ejector systems has been conducted by the NACA and others, but the article entitled "Theory and Experiments on Supersonic Air to Air Ejectors" by Fabri and Paulon, appearing in NACA TM 1410 dated September 1958 appears to be the most applicable to the present concepts. While that reference involves a utilization in which the primary or high-pressure flow is produced by a supersonic convergent-divergent nozzle, the reference differs substantially from the present in that the primary jet is a cold one and no effect of temperature differentials between the primary and secondary streams was investigated. Therefore, it is only of general interest that the result of these cold flow studies indicate that a nozzle ejector system is feasible. Although it is contemplated that this invention could be utilized without additional combustion, an important embodiment of this invention utilizes a series of auxiliary combustors disposed about the augmenter to bring about combustion in the space between the inner and outer cowls of the augmenter.

In the past, several types of augmenters have been employed for increasing the mass flow of jet propulsion devices such as turbo-jet engines. Because engines that consume atmospheric oxygen during the powered flight need not carry an oxidizer aboard as do rockets, their $I_{sp}$ would be many times greater than the $I_{sp}$ of a rocket, which usually falls between 200 and 300. When using augmenters with jet engines, the jet exhaust has been oxygen rich, with the secondary air having little if any chemical reaction with the products of combustion emanating from the engines. Accordingly, augmenters have not been extensively used heretofore due to the fact that often the additional thrust did not compensate for the weight penalty and additional drag caused by the inclusion of the augmenter in the arrangement.

The present thrust augmentation arrangement, however, is quite efficient, and is at least partly predicated upon the fact that the products of combustion ordinarily emanating from a rocket engine are fuel rich, so by adding additional atmospheric air to mingle with these rocket exhaust products, a chemical reaction takes place which increases the total energy of the combined jet. This reaction takes place in a mixing chamber provided in the outlet portion of the augmenter, downstream of the basic rocket engine, at a point where the exhaust products from the rocket and the secondary air come together.

Conventional rocket exit velocity is supersonic, and the mixing process must be arranged in such a manner that the formation of shock fronts is avoided. Shock of course is a spontaneous, discontinuous change of state from one of low entropy to one of high entropy, and in order to avoid shock, there must be an area change, change in mass flow, change in impulse and change in stagnation temperature, either separately or combined.

According to one aspect of this invention the products of combustion emanating from the rocket engine are surrounded by secondary air at low pressure through the augmenter, which low pressure is obtained by providing a throat in the duct for secondary air in the augmenter, located ahead or upstream of the mixing chamber so that this secondary air reaches the mixing chamber with accompanying decrease in static pressure. Because of this, the engine can be altered so as to have an extended expansion, with the result that engine efficiency can be improved. Even a mixing chamber designed for minimum chemical reaction will still yield an over-all improvement in performance for the following reason:

As is known, a rocket engine is ordinarily limited to approximately an 8–1 expansion ratio at sea level, for if a higher ratio were attempted, the manifestation of sea level pressure into a larger nozzle will cause separation of the exhaust inside the nozzle, with corresponding losses. By virtue of the lowering of the pressure surrounding the rocket gases it is feasible to employ a rocket engine having an extended expansion ratio of 15–1, with accompanying substantial increases in thrust and efficiency. This is of course made possible by virtue of the fact that the cone of rocket gases emanating from the rocket engine is surrounded by a layer of low pressure gas which prevents atmospheric pressure from reaching the rocket nozzle, which consequently prevents and completely avoids the creation of separation and shock.

Another aspect of this invention involves as an object the addition of energy to the secondary air. In such an embodiment, additional fuel is injected in the secondary air flowing through the augmenter, and after all of the fuel or combustibles have completed their reaction they still further increase the energy of the combined jet, to the further advantage of the thrust of the rocket. In other words, the pre-heating of the atmospheric air by fuel injection and combustion, accompanied by the mixing of these products with the rocket exhaust products causes a substantial enhancement of the thrust and efficiency of the rocket.

An exemplary augmentation arrangement according to this arrangement involves the use of a jettisonable augmenter disposed in surrounding relationship about the basic rocket engine and spaced therefrom so as to define a substantially circumferential passageway through which secondary air flows in an essentially surrounding relationship about the rocket motor. The forwardmost portion of the augmenter is of slightly larger diameter than the basic outside diameter of the missile just forward of the rocket motor section thereof, with an inlet for secondary air thereby being defined between the augmenter and the sidewall of the rocket. The augmenter also extends downstream beyond the exit plane of the rocket motor so as to define a mixing chamber in which the secondary air from the augmenter may mingle with the products of combustion emanating from the motor.

As is known, any additional reaction that takes place downstream of a rocket nozzle is a total loss from the standpoint of thrust so by virtue of the extension of the sidewalls of the augmenter for a considerable distance downstream of the exit plane of the rocket engine, the aforementioned mixing chamber may be utilized for providing thrust, which otherwise would not have been obtained due to the burning taking place entirely outside of any nozzle. The geometry of the interior of the augmenter is preferably of such a nature as to define a throat intermediate the inlet and mixing chamber so that secondary air flowing therethrough attains sonic velocity with an accompanying decrease in pressure. As an additional facet of the augmenter arrangement, a plurality of fuel nozzles may be disposed to inject fuel into the secondary air at a location upstream of the throat defined in the augmenter so that additional fuel can be combusted.

The augmenter is preferably supported from a gimbal arrangement of the basic rocket engine so that in an embodiment in which the rocket is steered by the pivotal movements of the rocket motor about the centerline of the vehicle, the augmenter will undertake movements in concert with the rocket engine so as to continue the desired relationship despite movements away from co-incidence with the center line of the basic vehicle. The augmenter is arranged to be jettisoned at such a point in the flight of the rocket that it becomes no longer useful. The termination of the usefulness of the augmenter is reached at such an altitude at which the thrust of the augmenter-rocket engine combination equals that of the engine alone. Accordingly, the preferred augmenter arrangement employs a number of devices arranged to automatically separate the augmenter arrangement from the rocket at a certain altitude so that the unshrouded rocket motor can effectively provide thrust for the rocket. It should be noted that inasmuch as a so-called altitude rocket motor can be employed even for sea level takeoff by virtue of the augmenter, the basic engine remaining after the jettisoning of the augmenter is much more efficient at and above the jettison altitude than would have been the rocket engine designed for satisfactory sea level operation, which otherwise would have had to be used in order to accomplish takeoff satisfactorily.

Additional facets of this invention involve arrangements for cutting off fuel to auxiliary burners as the augmenter is jettisoned, an arrangement for providing constant inlet area for secondary air flowing into the augmenter despite gimballing movements thereof, for varying the secondary air inlet as the rocket speed increases, and for providing a cooling flow over the mixing chamber wall of the augmenter in order to prevent destruction by the hot gases.

These and other objects, features and advantages of this invention will be apparent from the study of the drawings of this application in which:

FIGURE 2 is a view of the lower portion of the missile according to FIGURE 1, but to a larger scale to reveal details of the gimballing and augmentation arrangements;

FIGURE 3 is a lateral cross-sectional view taken along line 3—3 in FIGURE 2, revealing gimballing and manifolding details;

FIGURE 4 is a fragmentary cross-sectional view taken along line 4—4 in FIGURE 3, and turned 90° from the corresponding position in FIGURE 3 in the interest of clarity;

FIGURE 5 is a cross-sectional view taken through a portion of the centerline of an explosive bolt, revealing fuel line details;

FIGURE 6 is a view taken through a typical fuel nozzle employed to inject fuel into the secondary air flowing through the augmenter arrangement;

FIGURE 7 is a view taken along line 7—7 in FIGURE 2 and revealing an actuator arrangement responsible for gimballing the rocket engine;

FIGURE 8 is a view taken along line 8—8 in FIGURE 3 and revealing the detail associated with the mounting of an air inlet actuator on the skirt of the rocket vehicle;

FIGURE 9 is a fragmentary view taken along line 9—9 in FIGURE 8, revealing a typical circumference actuator for controlling the size of the augmenter opening for admitting secondary air;

FIGURE 10 is a view of an actuator taken along line 10—10 in FIGURE 9;

FIGURE 12 is a greatly enlarged view of a typical orifice plate assembly which brings about mixing of fuel and oxidizer upon entry thereof into the combustion chamber of rocket engine.

Figure 1:
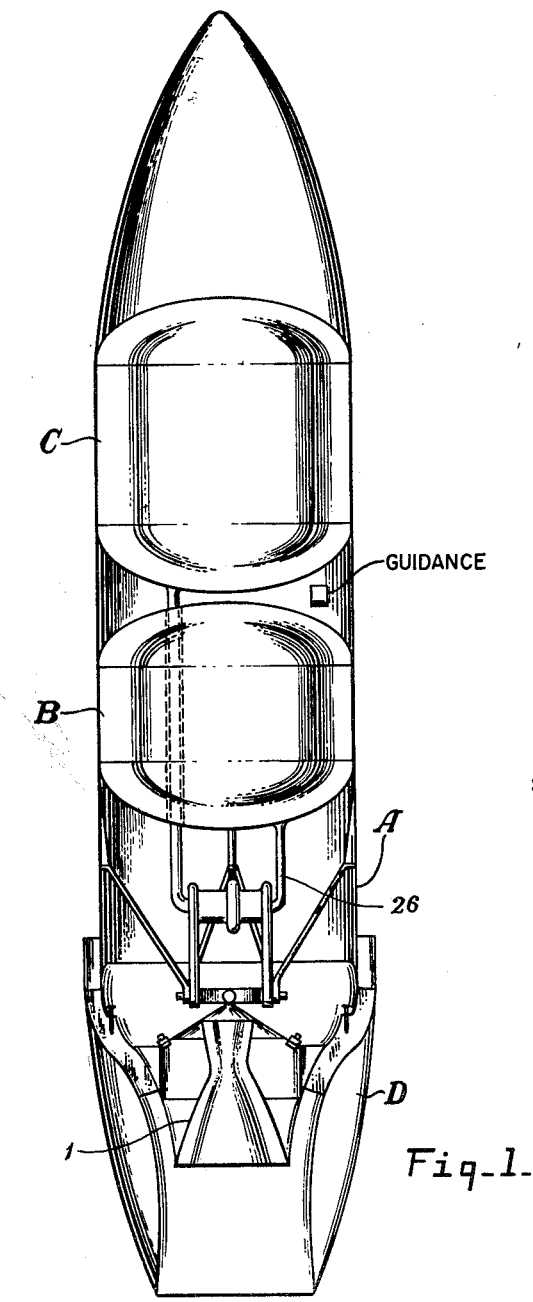
FIGURE 1 is a longitudinal cross-sectional view of a typical liquid fuel rocket equipped with an augmenter arrangement according to this invention, with portions removed to reveal inner details.

Turning now to the figures of drawing, in FIGURE 1 an exemplary missile A is revealed, equipped with rocket engine 1 mounted in the lower portion thereof to provide thrust. Inasmuch as engine 1 of this embodiment is a liquid fuel engine, it is arranged to be fed propellants from fuel tank B and oxidizer tank C. Releasably attached in spaced relation about rocket engine 1 is augmenter D, which is responsible for bringing about marked advantages in thrust and efficiency over prior art rocket arrangements, as will be described as greater length hereinafter.

Rocket engine 1 is typical of many rocket engines utilized for liquid fuel rockets, although in the present instance a gimballing arrangement is provided so that in response to the control system of the rocket, the rocket engine can be pivoted to one side or the other of the centerline of the missile during flight to correct for flight aberrations of the missile from the desired course.

As seen in FIGURES 2 and 3, a pair of lugs or ears 3 are provided on the upper portion of the rocket engine for the suspension thereof, with a pair of pins 2 pivotally securing ears 3 to a gimbal ring 4. As should appear obvious, by virtue of this pivotal arrangement, the rocket engine 1 can pivot from left to right as shown in FIGURES 1 and 2, even though gimbal ring 4 were held stationary. However, by virtue of outer gimbal pins 5, gimbal ring 4 is rotatably mounted so that the gimbal ring as well as the rocket motor suspended therefrom can move in a plane 90° away from the aforementioned direction of motion, or in other words, in and out of the plane in which FIGURE 2 is illustrated. By virtue of this arrangement, the common centerline of the two pair of pivot pins intersect at point 10 on the centerline of the rocket so as to minimize unbalance and to permit a symmetrical propulsion arrangement.

The outer ends of gimbal pins 5 are inserted into sockets 6 which are welded to support arms 7 arranged in a framework so as to support the gimbal arrangement. The arms 7 are in turn connected to brackets 8, which are a basic portion of the airframe of the missile, and are secured to skin 9 thereof. FIGURE 3 is illustrative of several of these features.

Actuator 70 is provided for bringing about movements of rocket motor 1 about pins 2, with one end of actuator 70 being secured to gimbal ring 4 as shown in FIGURE 2, and with the other end of this actuator being rotatably affixed to an extension 71 secured to the top central portion of rocket motor 1. See FIGURES 2 and 4. Since extension 71 extends for some distance above pins 2, it forms a lever for bringing about movements of the rocket motor. Accordingly, when actuator 70 is actuated in such a manner as to increase its length, rocket motor 1 is pivoted about pins 2 to the left as seen in FIGURE 2, whereas if actuator 70 is actuated in such a manner as to diminish its length, rocket motor 1 is swung to the right. Actuator 70 may be an electric screw jack, although it is preferable that it be a hydraulic actuator.

Similarly, actuator 72 is provided to bring about motion of rocket motor 1 about gimbal pins 5, so that the motor can be swung in a plane located 90° to the plane of motion about pins 2. One end of actuator 72 is secured to an enlargement 7a located on an arm 7, whereas the opposite end of 72 is connected to a bellcrank 73 tightly secured to an extension 5a of an outer gimbal pin, as seen at the left of FIGURE 2, and in FIGURES 3 and 7. As should be obvious, upon this actuator being caused to elongate or contract, appropriate motions of the rocket motor with respect to the basic rocket vehicle 1 are brought about. Thus it is possible to position the rocket motor so that its centerline will make an angle with the centerline of the rocket vehicle, and by appropriate simultaneous actuation of actuators 70 and 72, the motor centerline can be made to describe a conical surface having its apex at point 10, the point of coincidence of the centerline of the rocket vehicle with an imaginary inward extension of the inner and outer gimbal pins 2 and 5.

Augmenter D is advantageously provided to bring about substantial increases in thrust and efficiency of rocket engine 1. As best seen in FIGURE 2, it principally consists of an inner cowl 11 and an outer cowl 12 spaced therefrom so that a duct for secondary air is created in the annular space between the cowls. An outer fairing 18 is arranged to provide smooth aerodynamic contours for the augmenter to minimize undesired drag. It is to be noted that the area between the inner and outer cowls is quite large at entrance 14, reduces to a minimum at 15 to form a throat, and enlarges again as it connects at the entrance 16 to a mixing chamber 17 defined in the lower end of the augmenter, below the exit plane of rocket motor 1. Therefore the channel or passage for secondary air is seen to be shaped in the configuration of a convergent-divergent nozzle so as to achieve supersonic air velocity at the entrance 16 to the mixing chamber. The inner and outer cowl members are held in the desired relation by a series of spaced flat plates 13 secured to the cowl members in the manner shown in FIGURE 3.

The augmenter D is arranged to provide thrust augmentation at take off and for a period of flight after take off, but ultimately is to be jettisoned at or near the altitude at which it becomes no longer useful. To this end, augmenter D is suspended so that it can be separated automatically by appropriate separating means. A cylindrically shaped member 19 is secured about its lower periphery to an inner portion of cowl 11 in the general manner shown in FIGURE 2, with the upper peripheral edge of member 19 being secured to the inner diameter of flat ring member 20. The outer edge of member 20 is also secured to the inner surface of cowl 11. Thus members 19 and 20 extend approximately 360° about the rocket motor to create a sturdy support means by which the augmenter can be supported.

A conically shaped member 23 is secured to the upper portion of the rocket engine so as to move therewith, with cone 23 being pierced so that it can be slipped over the ears 3 and extension 71 and then secured to the engine. Instead of cone 23 being permanently secured to the structure formed by members 19 and 20, it is instead secured thereto by the use of explosive bolts 24. As will be noted from FIGURE 3, a number of bolts 24 are employed about the periphery of cone 23, and as seen in FIGURE 5, these bolts pass through holes 83 and 84 located in the cone 23 and the somewhat conical flange 21 on the inner diameter of the flat plate or ring member 20, as well as a hole in the flange of member 19. Above cone 23 and surrounding bolt 24 is a washer 85 having a circumferential groove 86 formed in its lower face and being connected by a fuel pipe 92 arranged to deliver fuel to groove 86. Below flange 21 of ring member 20 a washer 87 is located, having a groove 88 in its upper face, with grooves 86 and 88 defining a cavity for fuel. Gaskets 89 are interposed between the washers and the members 19, 21 and 23, so that when nut 90 is threaded onto bolt 24 and tightened, the washers and gaskets will be tightly clamped between nut 90 and bolt head 91 so as to hold the entire arrangement in fuel-tight relation. By the use of a number of bolts 24, the augmenter arrangement is quite properly supported.

In addition to supporting the augmenter arrangement from cone 23, the bolts 24 are interrelated with the fuel lines to the nozzles 48 employed for injecting fuel into the secondary air flowing through the augmenter. Tubes 92 conduct fuel from circumferentially-disposed fuel header 50 to each bolt assembly, with the tubes being connected to the washers 85, so that fuel can fill the groove 86 thereof. Inasmuch as a plurality of holes 93 are provided in the four gaskets illustrated, the fuel can pass directly into the groove 88 from which it may pass through pipe nipple 94, elbow 95, and tube 49 to the nozzle body 48 of the respective fuel nozzle. The fuel enters space 96 of each fuel nozzle body, which is a space sealed on the top by means of a cap 97 from which is suspended a spindle 98 carrying a plug 99 having a spiral groove 100 on its periphery. Below plug 99 is a conical space 101 in which an orifice 102 is centrally disposed at the apex of the conical space 101. Thus when fuel entering through tube 92 under pressure has passed through the passages associated with an explosive bolt, it will enter cone 101 in such a manner as to have a rotating motion that it acquired in passing through the spiral groove. This results in the fuel being atomized into fine droplets when it issues from orifice 102, so that it enters passage 14 of the augmenter in such a condition as to be readily combustible.

Returning to a consideration of FIGURE 5, each bolt 24 is further provided with a bore 103 disposed in its head end and sealed by a screw 104 threaded into the opening of bore 103. This bore is filled with explosive material 105 such as cordite or gunpowder, which may be ignited by sending an electrical current through wire 106. The outer surface of bolt 24 is sharply notched at 107 so that it will break at this notch when the explosive charge has been detonated. The simultaneous failure of all of the bolts 24 will allow the augmenter to drop away, thus permitting the rocket engine 1 to continue to power the vehicle, unassisted by the augmenter, for a length of time thereafter.

As seen in FIGURE 3, a solenoid valve 51 is provided, which does not permit fuel from fuel header 50 to flow to the explosive bolts until it has been electrically energized. This valve may be similar to Part No. 82627 manufactured by the Automatic Switch Company, 56–A Hardore Road, Floran Park, New Jersey. Although only one valve 51 is illustrated, it is to be understood that if desired a solenoid valve may be provided for each explosive bolt. The fuel downstream of the solenoid valve will instantly evaporate upon decompression in the rarified atmosphere at which the explosive bolts are to be detonated, and at such low pressures, even a chemically correct measure cannot explode, so any danger of fire or explosion is practically non-existent.

As previously indicated, augmenter D undertakes movement with respect to the centerline of the missile by virtue of the operation of actuator 70 and 72, which respond to guidance signals. Accordingly, the uppermost end 25 of inner cowl 11 of the augmenter is rounded in the general form of a portion of a sphere having for its center the point 10. This upper portion is of such a diameter as to fit snugly inside the lowermost portion of skin 9 of the missile so as to create a desirably close fit. Provisions are made for keeping the inlet area of the augmenter substantially constant despite movements of the motor and augmenter, as well as for accomplishing a gradual reduction in such area as the rocket accelerates to higher speeds. These details will be discussed at greater length hereinafter.

The propellants to be supplied to rocket engine 1 are contained in fuel tank B and oxidizer tank C, as previously indicated. Fuel is conducted through pipe 26 from tank B to the inlet side of pump 27, which pump is driven by a turbine 28. The pump 27 pressurizes the fuel and delivers it to pipe 29, which is connected at its bottom end to a ring-shaped flat box 30 adapted to slip over one of the gimbal pins 5 in the manner shown in FIGURE 2. This box 30, which may be referred to as a fuel receiver, is closed on all sides except on the flat side inside the ring gasket 31, in which one or more openings 108 are provided so that fuel may flow to curved pipe 32, which is fastened to the gimbal ring. Ring gasket 31 may be of elastic material such as rubber or the like, which is, for example, vulcanized to both members 30 and 32. Because of its flexibility, ring gasket 31 is capable of maintaining its fuel-tight seal between latter members, despite some twisting movement tending to occur as gimbal ring 4 and hence curved pipe 32 rotate about gimbal pins 5. From pipe 32 the fuel flows through inner gasket 109 similar to gasket 31, into fuel receiver 33, which is part of an arrangement quite similar to that of fuel receiver 30, and permits motion about gimbal pins 2 without leakage of fuel. From receiver 33, fuel is delivered via a short curved pipe 34 disposed on the top of the rocket engine and leading into the upper fuel chamber 35. Note FIGURE 4.

On the outer portion of the wall of the rocket engine is a comparatively large number of cooling tubes, approximately one-half of which extend from the upper fuel chamber 35 to ring header 38 in the general manner illustrated with regard to tube 36 in FIGURE 2. Ring header 38 is disposed at the exit plane of the rocket engine, and upwardly from it the alternate tubes extend in the manner shown with regard to tube 37, upwardly from ring header 38 to carry fuel to lower fuel chamber 39. By the use of tubes 36 and 37, the rocket engine is kept reasonably cool, with but a small rise in fuel temperature being involved.

From chamber 39 the fuel is injected into the combustion chamber 41 of rocket engine 1 by means of orifice plates 40, one of which is shown in detail in FIGURE 12. A number of short tubes 115 are disposed about orifice plate 40, preferably in a plurality of circular arrays concentrically disposed about oxidizer pipe 47. These tubes 115 extend from the upper portion of orifice plate 40 so that fuel in the chamber 39 can be carried directly to orifice holes 116, thereby to be injected into the combustion chamber 41. Orifice holes 116 are disposed in a plurality of circular arrays about the under face of orifice plate 40. As will be described hereinafter, the relationship of orifices 116 to the oxidizer orifices 117 is such that the jets interfere as shown in FIGURE 12, and cause atomization for ready combustion.

By an arrangement substantially similar to the fuel arrangement, the oxidizer contained in tank C is conducted through pipe 42 to the inlet side of pump 43, which is also driven by turbine 28, and thence to pipe 44. The lower end of pipe 44 is enlarged to form a receiver 111, which is connected in fluid-tight relation to curved pipe 45 by means of a gasket 112 that allows for motion about gimbal pins 5. Therefore, the oxidizer pressurized by pump 43 is delivered via pipe 45 to receiver 46, and is connected thereto by gasket 113 as best seen in FIGURE 4. As previously stated with regard to the gaskets utilized in the fuel system, these ring gaskets are made of elastic material such as rubber, which may be vulcanized or otherwise secured to both the receiver and the curved pipe adjacent it. These gaskets are proportioned so as to permit the relative motion that necessarily takes place in the fuel and oxidizer lines during gimballing of the rocket engine.

From receiver 46 oxidizer flows through pipes 47, in the manner revealed in FIGURE 3, to orifice plates 40. Referring to FIGURE 12, it will be seen that each pipe 47 delivers oxidizer into a main portion of the orifice plate, with the oxidizer flowing freely in and around fuel tubes 115. A number of generally circular arrays of orifice holes 117 are disposed intermediate the rows of fuel orifices 116 so that the fuel and oxidizer jets impinge, as previously mentioned. The orifice hole diameter can be the same for both fuel holes and oxidizer holes, such as for example .040 to .050 inch in diameter. Valve 68 in pipe 26 and valve 69 in pipe 42 are utilized to control the flow of fuel and oxidizer respectively, and may be operated automatically by an appropriate portion of the guidance system of the rocket illustrated in FIGURE 11 in order to assert the proper control over the combustion taking place in the rocket.

As a supplement to the combustion in the rocket engine 1, it may be desirable to employ additional combustion in the augmenter in order to derive additional thrust. Increase in thrust must come either from an increase in mass flow or from an increase in velocity, or both, according to the formula $F = \dot{m}$. As is well known, an increase in mass flow can be obtained by feeding inert gas such as nitrogen mixed with combustion products through the augmenter. In certain NASA experiments it was found that by mixing inert rocket gas derived from $H_2O_2$ with fresh air, approximately 15% increase in thrust was obtained.

As to the velocity term $c$ in the above formula, an increase in velocity can only come from an increase in energy of the mixed stream, which can only be derived from chemical energy through combustion as follows:

(1) By mixing fresh air with the fuel-rich rocket exhaust gas. Even though a short mixing chamber will cause some combustion, to combust all of the fuel present in the exhaust gas may require an excessive length of the mixing chamber and even then all of the oxygen coming in through the augmenter may not be used up.

(2) By pre-heating the air by fuel injection and combustion. This does not require a long mixing chamber, and in the present case 1 lb./sec. of fuel will cause an increase in thrust of 2500 lbs., or in other words, the fuel has an $I_{sp}$ of 2500 if oxygen from the atmosphere is used.

(3) A combination of 1 and 2. Although such must be determined experimentally for each rocket concerned, it would appear that the combination of these effects is the most likely.

In order to accomplish the additional combustion, the aforementioned nozzles 48 may be employed to inject fuel into the secondary air flowing through the augmenter if desired, although if such additional combustion is brought about, it is usually necessary to cool the mixing chamber wall of the augmenter. So that this may effectively be done, the outer cowl of the augmenter is lined with tubes 52 which are open at both ends. Water or other coolant is contained in the space 53 defined between cowl 12 and fairing 18, and some of this coolant will enter the tubes 52, where it will be heated by the combustion gases in the mixing chamber. As a consequence, the coolant in the tubes slowly evaporates, and the steam formed flows upwardly through the tubes, and out into the atmosphere from openings 54. In this manner the mixing chamber is kept at a moderate temperature.

To adapt the augmenter to variable speed flight, a variable diffusor portion has been incorporated in the upstream end or entrance of the augmenter. This consists of a series of movable plates 55 mounted on the outer cowl by means of hinges 56, shown in FIGURE 2. Each plate 55 overlaps adjacent plate on one side as shown at 57 in FIGURE 3. So that these plates can be effectively moved, a plurality of actuators 58 are located about the circumference of the inlet portion of the augmenter. These actuators 58 each employ a piston 59, which via a piston rod 60 connects to a hinge 61 on top of a plate 55. This piston is ordinarily urged inwardly by means of a spring 62, best seen in FIGURE 9, but this motion is prevented by means of hydraulic fluid that is contained in the closed end 63 of the cylinder behind piston 59.

When plates 55 are in the position shown in FIGURES 2 and 3, the entrance opening 64 of the diffuser is at maximum, and in this position it is most suitable for operation at zero flight speed. As the vehicle thereafter gains speed, the speed of the incoming air through the opening 64 increases. This enables the opening to be decreased in size and still admit more air than when the missile was at zero speed. Moreover as the air passes through the now diverging diffuser, the air pressure increases so that more air enters at higher pressure, and hence the potential energy of the air has increased. To obtain a desired reduction of the entrance opening, it is only necessary to reduce the hydraulic pressure in the space 63, or to permit some of the liquid to bleed away. Therefore, it is to be seen that the size of the inlet opening 64 can be controlled to obtain optimum conditions for any subsonic vehicle speed.

It is necessary for the augmenter to move relatedly with the rocket engine as it gimbals with respect to the rest of the missile. When the rocket engine gimbals for example in such a direction that the bottom of the rocket and augmenter move to the left as depicted in FIGURE 2, point 61 on the diffuser moves upwardly and point 65 moves down. Such a movement as this requires that the actuators physically move either upwardly or downwardly. Accordingly, each actuator 58 is mounted in a slot 114 in the skin 9, as shown in FIGURE 8, each of which slots run parallel to the axis of the vehicle. In this manner, the actuators do not present any restriction to the proper gimballing of rocket engine and augmenter. It should be noted that slots 114 extend to the lowermost portion of skin 9, so that upon the augmenter being dropped, the actuators can slide out of their respective slots and fall away with the augmenter.

It should also be noted that according to this arrangement, the opening 64 does not change on one side of the missile with respect to the size of the opening on the other side thereof, for the actuators 58 maintain a proper circumferential configuration at all times. This is made possible because the opening 64 is only a function of the tension of the spring 62 and the pressure of the hydraulic liquid, which can be varied independently of the gimballing motion.

Figure 11:
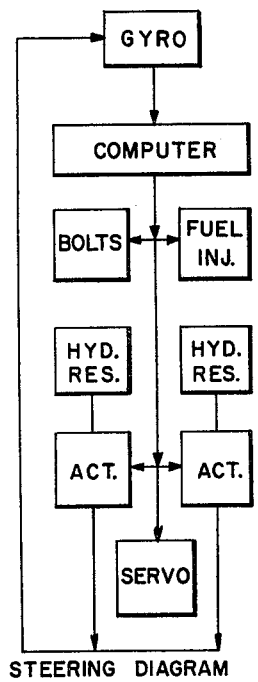
FIGURE 11 is a typical steering diagram, involving certain guidance units of the missile.

Referring to FIGURE 11, the gyro continually signals to the computor its relative position with respect to the vehicle axis, with the computor verifying these positions with instructions in its memory circuit. The computor also contains instruction for the fuel injection, such as when to start the flow of fuel, and when to shut it off. As also will be seen from FIGURE 9, the explosive bolts are detonated by a signal from the computor, typically at a time shortly after the solenoid valve 51 has been closed to prevent the further flow of fuel into the header 50. As to guidance, if any signal received from the gyro does not agree with instructions, the computor determines corrective action and sends appropriate signals to the hydraulic reservoir and to the actuators for controlling the position of the rocket motor with respect to the centerline of the missile. Appropriate follow up arrangements inform the computor via the gyro of the new position. The computor also has additional responsibilities such as controlling the mixture ratio to the rocket motor 1, staging and the like, but this of course exceeds the scope of this discussion.

Since it is desired to keep constant the amount of fuel injected into the secondary air by the fuel nozzles 48, a pressure regulator may be employed to control the pressure at the orifice of each injector so as to obtain a constant rate of flow therethrough. One pressure regulator suitable for this purpose has been found to be regulator number 1350–20511, manufactured by The Robertshaw-Fulton Company of Anheim, California. The actuators responsible for gimballing the rocket motor may be of a type such as actuator number 12247–3, manufactured by the Futurecraft Company of El Monte, California. The computor may be of a type made by the Gianinni Company of Pasadena, California.

As to operation of the main rocket engine, the turbo pump system is designed to run at constant speed and to make the oxidizer-fuel flow rate ratio exactly equal to the desired mixture ratio of the engine. At rated speed, the discharge pressure of both pumps is, for instance 800 p.s.i. Due to the resistance in the pipe lines this may come down to a little less, to 500 p.s.i. at the nozzles for example, but it will be constant. Therefore also the nozzles, having a fixed resistance to flow, will have a constant flow rate. Because the injector plates 40 also have a fixed resistance to flow, the flow rate of the propellants entering the combustion chamber is constant and, therefore, the combustion pressure is constant.

In flight the turbine may speed up a little, because the inlet pressure to the pumps increases some with time. As a consequence, the pressures everywhere on the discharge side of the pumps will rise, say 2% of the local pressure. Since the flow rates everywhere are proportional to the square root of the pressure, they all will rise about 1%. The engine thrust goes up 1%, so does the fuel injection rate at the nozzles 48. Therefore the rate of fuel flow is maintained proportional to the gas mass flow of the rocket.

Sometimes a control is used, which corrects the turbine speed, by feeding less gas to the turbine 28, when the combustion pressure rises, in chamber 41. It is to be understood that this control can be eliminated in many cases especially if the engines are calibrated.

Whether or not the combustion chamber pressure is constant, the injection flow rate is automatically controlled by the size of the orifices 102 and the fixed resistance of the pipe lines.

It is to be understood that this invention is not to be limited except by the scope of the appended claims.

We claim:

1. In a rocket missile, a rocket engine for combusting fuel in order to develop thrust for the propulsion of said missile, said engine being mounted in gimbals so as to be steerable, an augmenter disposed in essentially surrounding relationship about said engine so as to be movable therewith and defining a substantially circumferential passageway therebout through which secondary air may flow, adjustable inlet means at the upstream end of said augmenter for admitting secondary air into said augmenter in order to mix with the products of combustion emanating from said engine, means for maintaining the area of said inlet substantially constant despite movements of said motor and augmenter, and also for varying the area of said inlet so as to alter the amount of air entering said augmenter in response to changes in missile speed and atmospheric density, a throat area defined in said augmenter for bringing about sonic velocity of said secondary air prior to mixing with the products of combustion emanating from said engine, combustion means upstream of said throat for combusting additional fuel in said secondary air, and means for jettisoning said augmenter at a predetermined altitude.

2. The rocket missile as defined in claim 1 in which fuel lines are provided to supply fuel to said conductors and in which a plurality of explosive bolts are utilized for securing said augmenter in said surrounding relationship about said engine, said bolts, when detonated, causing said augmenter to be jettisoned, said bolts including means for severing the fuel lines to said combustors, thereby preventing said lines from hindering the falling away of said augmenter from the missile.

3. The rocket missile as defined in claim 1 in which a liquid fuel and liquid oxidizer tanks are carried aboard said missile for supplying propellents to be combusted in said engine, pump means for delivering said propellents to said engine, and means for passing at least one of said propellents through at least a portion of said rocket engine.

4. An augmentation arrangement for a missile to substantially increase the thrust thereof, comprising at least one rocket motor for combusting fuel to provide thrust for said missile, gimbal support means for supporting said motor for pivotal movements to provide steering for said missile, an augmenter releasably secured in essentially surrounding relationship about said rocket motor and spaced therefrom so as to define a substantially circumferential passageway for secondary air to flow in enveloping relationship about said rocket motor, said augmenter being of slightly larger diameter than the diameter of said missile and defining a substantially circumferential inlet for secondary air at the upstream end of said augmenter, means for maintaining the area of said inlet substantially constant despite movements of said motor and augmenter, said means also accomplishing a gradual reduction of such area as missile speed increases, said augmenter extending downstream beyond the exit plane of said rocket motor so as to define a mixing chamber for said secondary air to mingle with the products of combustion emanating from said motor, said passageway being constricted at a location intermediate said inlet and said mixing chamber to define a throat for causing said secondary air to attain supersonic speed, and fuel injection means upstream of said throat for injecting additional fuel into said secondary air, thereby to increase the combustion taking place in said mixing chamber downstream of the exit plane of said rocket motor.

5. The augmentation arrangement as defined in claim 4 in which said gimbal support means includes a gimbal ring from which said rocket motor is pivotally supported for steering movements in one plane, and pivotal support means for supporting said gimbal ring for steering movements in a plane disposed at substantially right angles to said one plane, so that said rocket motor and said gimbal ring can move relatedly in latter plane, and separate actuator means for controlling the basic movements of said motor with respect to each of said planes.

6. The augmenter arrangement as defined in claim 4 in which said rocket motor utilizes two liquid propellants supplied by separate conduits, a portion of each of said conduits being disposed alongside said gimbal support means, and flexible couplings in said conduits for allowing movement of said portion of each conduit as said gimbal support means moves, without interfering with the flow of propellants therethrough.

7. An augmentation arrangement for a missile as defined in claim 4 in which separating means are provided for bringing about the jettisoning of said augmenter at a predetermined altitude, said means simultaneously closing off the fuel supply to said fuel injection means.

8. An augmentation arrangemnet for a missile as defined in claim 4 in which said augmenter is defined by a cowl member disposed adjacent and outwardly of said circumferential passageway for secondary air, and a fairing disposed outwardly of said cowl and defining the outer aerodynamic contour of said augmenter; a generally toroidally-shaped reservoir defined between said cowl member and said fairing, in which aqueous coolant is carried, outlets disposed about an upstream portion of said fairing, conduit means associated with said cowl member for connecting said reservoir portion of said augmenter with said outlets, whereby as the aqueous coolant in said augmenter is heated as a result of the heat generated in said mixing chamber, a cooling flow of steam and water vapor takes place through said connecting means to cool said augmenter.

9. In a missile, at least one rocket engine for providing thrust, gimbal means supporting said engine for controlled movement with respect to the centerline of said missile to correct for aberrations in flight of said missile, actuator means for bringing about such movements of said rocket engine, guidance means in said missile for providing signals to said actuator means for controlling the movements of said rocket engine about its support, thereby to cause said missile to follow a pre-established trajectory, and a jettisonable augmenter arrangement disposed in surrounding relationship about said rocket engine and defining a substantially circumferential passageway thereabout, means for supporting said augmenter about said engine so as to define a substantially annular air induction passage through which secondary air may flow for thrust augmentation purposes, said substantially annular configuration being maintained in all positions of related movement of said augmenter with said engine as said engine is selectively moved to change the angle at which thrust is delivered to correct the flight path of the missile.

10. The missile arrangement as defined in claim 9 in which said guidance means includes a gyro and a computer, said computer having a memory circuit with which the gyro position with respect to the missile axis can be verified with instructions in said memory circuit, said computer also controlling the combustion in said engine and the point at which said augmenter is jettisoned.

11. An augmenter for increasing the thrust of a ducted rocket engine, said augmenter comprising an outer circumferential fairing for providing proper aerodynamic contour and an inner cowl member circumferentially disposed about the interior of said fairing, said augmenter being disposed and secured in spaced relation about a rocket engine which is tiltably mounted with respect to the centerline of a missile, and having an inlet at its upstream end through which atmospheric air may flow, said augmenter extending alongside as well as downstream of said rocket engine and defining a mixing chamber in which the products of combustion emanating from said rocket engine and the air entering from said inlet may mingle and be combusted, and means for controlling the fuel-air mixture being combusted in said mixing chamber, said means including means at said inlet for assuring a substantially constant inlet area even during tilting movement of said rocket engine with respect to the centerline of its mounting, and for decreasing said inlet area as missile speed increases.

12. The augmenter arrangement as defined in claim 11 in which said rocket engine has an extended expansion ratio and designed for high altitude operation, releasable means associated with said augmenter for securing it in proper relation about said rocket engine to improve the low-altitude efficiency of said engine, and means for actuating said releasable means in flight to thereby jettison the augmenter.

13. In a missile propelled by a pivotally mounted, steerable rocket, a thrust augmenter disposed and releasably secured in surrounding relationship about said rocket and defining a passageway for secondary air, said augmenter relatedly movable with said rocket having an inlet through which secondary air may flow and an outlet downstream of the exit plane of said rocket, a throat defined in said passageway upstream of said exit plane for causing the secondary air entering said inlet to increase in speed to approach sonic velocity, at least one combustor upstream of said throat in which fuel can be combusted in order to increase the thrust of said missile, means for maintaining the area of said inlet substantially constant despite pivotal movements of said rocket and said augmenter, and for varying the area of said inlet so as to alter the amount of air entering said augmenter in response to changes in missile speed and atmospheric density, and a mixing chamber in said augmenter for bringing about the mixing of oxygen from the atmosphere with the fuel-rich products of combustion emanating from said rocket, thereby increasing the thrust of said missile.

14. A thrust augmentation arrangement for substantially augmenting the thrust of a missile or the like comprising a missile having at least one combustion engine for delivering jet thrust, gimbal means for supporting said engine and providing two degrees of freedom for said engine, an augmenter surrounding said engine and being movable therewith, said augmenter having an air inlet at the upstream end thereof into which atmospheric air may enter at supersonic speed, means for supporting said augmenter about said engine so as to define a substantially annular air induction passage in all positions of movement of said augmenter and engine as said engine is selectively moved to change the angle at which thrust is delivered to correct the flight path of the missile, said augmenter extending for a distance downstream of said engine so as to define a mixing chamber for secondary air flowing into said augmenter via said air inlet to mix with fuel-rich products of combustion emanating from said engine.

References Cited in the file of this patent

UNITED STATES PATENTS

| | | |
|---|---|---|
| 2,397,999 | Goddard | Apr. 9, 1946 |
| 2,610,464 | Knoll | Sept. 16, 1952 |
| 2,639,582 | Pearlman | May 26, 1953 |
| 2,641,902 | Kerr | June 16, 1953 |
| 2,648,192 | Lee | Aug. 11, 1953 |
| 2,654,320 | Schmid | Oct. 6, 1953 |
| 2,686,473 | Vogel | Aug. 17, 1954 |
| 2,740,356 | Millns | Apr. 3, 1956 |
| 2,850,977 | Pollak | Sept. 9, 1958 |
| 2,853,854 | Avery et al. | Sept. 30, 1958 |
| 2,861,420 | Lewis | Nov. 25, 1958 |
| 2,880,577 | Halford et al. | Apr. 7, 1959 |
| 2,882,679 | Karcher et al. | Apr. 21, 1959 |

OTHER REFERENCES

Publication: Aviation Age Research and Development Handbook, 1958–1959, pp. D5, 6 and 7 relied on.

Rocket Encyclopedia Illustrated, pp. 34–35, 140, 188–190, published by Aero Publishers, Inc., Los Angeles, Calif. April 28, 1959.